(12) United States Patent
Singh et al.

(10) Patent No.: US 8,757,024 B2
(45) Date of Patent: Jun. 24, 2014

(54) LINEAR MOTION ASSEMBLY WITH RECIRCULATION INSERT

(75) Inventors: Bir Inder Singh, Grand Blanc, MI (US); Jeffrey J. Anderson, Owosso, MI (US)

(73) Assignee: Linear Motion, LLC, Saginaw, MI (US)

( * ) Notice: Subject to any disclaimer, the term of this patent is extended or adjusted under 35 U.S.C. 154(b) by 305 days.

(21) Appl. No.: 13/075,455

(22) Filed: Mar. 30, 2011

(65) Prior Publication Data

US 2011/0239799 A1  Oct. 6, 2011

Related U.S. Application Data (60) Provisional application No. 61/318,826, filed on Mar. 30, 2010.

(51) Int. Cl.
*F16H 1/24* (2006.01)

(52) U.S. Cl.
USPC .................................... 74/424.86; 74/424.82

(58) Field of Classification Search
USPC .................................................. 74/86, 424.86
See application file for complete search history.

(56) References Cited

U.S. PATENT DOCUMENTS

| | | | | |
|---|---|---|---|---|
| 4,186,620 A | * | 2/1980 | Brusasco | 74/424.77 |
| 4,186,621 A | * | 2/1980 | Brusasco | 74/424.83 |
| 4,612,817 A | * | 9/1986 | Neff | 74/424.75 |
| 5,492,030 A | * | 2/1996 | Benton et al. | 74/441 |
| 6,286,383 B1 | * | 9/2001 | Shirai et al. | 74/424.88 |
| 6,484,599 B2 | * | 11/2002 | Blaurock | 74/424.75 |
| 6,516,680 B1 | * | 2/2003 | Nakamura et al. | 74/388 PS |
| 6,568,508 B2 | * | 5/2003 | West et al. | 184/5 |
| 6,584,869 B2 | * | 7/2003 | Grosspietsch et al. | 74/424.75 |
| 6,672,540 B1 | * | 1/2004 | Shaheen et al. | 244/99.3 |
| 7,210,369 B2 | * | 5/2007 | Hartig et al. | 74/424.86 |
| 7,350,434 B2 | * | 4/2008 | Nishimura et al. | 74/424.86 |
| 7,487,692 B2 | * | 2/2009 | Lin et al. | 74/424.86 |
| 7,523,682 B2 | * | 4/2009 | Liao et al. | 74/424.87 |
| 7,587,955 B2 | * | 9/2009 | Vierheilig et al. | 74/89.44 |
| 8,100,025 B2 | * | 1/2012 | Lin | 74/424.88 |
| 8,196,486 B2 | * | 6/2012 | Harada et al. | 74/424.81 |
| 2002/0040614 A1 | * | 4/2002 | Grosspietsch et al. | 74/424.75 |
| 2002/0144560 A1 | * | 10/2002 | Yatsushiro et al. | 74/89.4 |
| 2003/0051569 A1 | * | 3/2003 | Kapaan et al. | 74/424.85 |
| 2004/0093970 A1 | * | 5/2004 | Iida et al. | 74/89.33 |
| 2005/0000309 A1 | * | 1/2005 | Perni et al. | 74/424.82 |
| 2006/0169079 A1 | * | 8/2006 | Lee et al. | 74/424.82 |
| 2008/0016973 A1 | * | 1/2008 | Husistein | 74/424.87 |
| 2009/0090207 A1 | * | 4/2009 | Chang et al. | 74/424.86 |
| 2012/0192667 A1 | * | 8/2012 | Chen et al. | 74/424.82 |

\* cited by examiner

*Primary Examiner* — Troy Chambers
*Assistant Examiner* — Zakaria Elahmadi
(74) *Attorney, Agent, or Firm* — John D. Wright; Dickinson Wright PLLC (57) ABSTRACT

A linear motion assembly includes a screw having a helical external groove extending over a plurality of turns with a radially outwardly extending helical land formed between adjacent turns and a ball nut having a through bore configured for receipt of the screw. The ball nut has a helical internal groove extending over a plurality of turns with a radially inwardly extending helical land formed between adjacent turns. The helical land of the ball nut is radially aligned with the external groove of the screw and the helical land of the screw is radially aligned with the internal groove of the ball nut. At least one helical recirculation insert having a circuitous recirculation groove is configured in radial alignment with the radially inwardly extending helical land of the ball nut and the external groove of the screw, wherein a plurality of balls are received in the circuitous recirculation groove.

15 Claims, 7 Drawing Sheets

LINEAR MOTION ASSEMBLY WITH RECIRCULATION INSERT

CROSS-REFERENCE TO RELATED APPLICATION

This application claims the benefit of U.S. Provisional Application Ser. No. 61/318,826, filed Mar. 30, 2010, which is incorporated herein by reference in its entirety.

BACKGROUND OF THE INVENTION

1. Technical Field

This invention relates generally to linear motion assemblies, and more particularly to linear motion assemblies having load bearing ball recirculation mechanisms.

2. Related Art

Linear motion assemblies, such as ball screw assemblies, for example, are used to effect linear actuation in various industries, such as machine tool, automotive, aircraft and aerospace, for example. Typically, a commercial ball screw assembly includes a screw with a continuous external helical ball groove and a ball nut with a continuous internal helical ball groove. The external helical ball groove of the ball screw and the internal helical ball groove of the ball nut are configured with substantially identical uninterrupted leads. With the ball nut received coaxially about the ball screw, the respective internal and external helical ball grooves are arranged opposite one another in radially aligned relation and a plurality of balls are disposed in a single continuous helical ball raceway formed between the opposed, continuously aligned internal and external helical ball grooves.

Typically, a ball return mechanism is incorporated in the ball nut to maintain the balls within the ball nut and within the ball raceway as the ball nut and screw move axially relative to one another. The ball return mechanism typically includes a pair of tubes or inserts disposed adjacent axially opposite ends of the ball nut, wherein the tubes or inserts are configured to recirculate the balls from the raceway adjacent one end of the nut to the opposite end of the raceway adjacent the opposite end of the ball nut. Accordingly, during recirculation, the balls traverse generally parallel to a central longitudinal axis of the assembly over a plurality of turns of the ball screw and ball nut helical grooves. Though the known tube and insert ball return mechanisms are generally effective in use, difficulties can arise from time to time. One such problem is when the balls become jammed within the raceway, particularly at the location of the ball return mechanism. In addition, manufacture and assembly of the tubes or inserts can prove challenging due to the need to having precisely configured and oriented structural features, particularly at the ends of the return mechanisms. The ends must be precisely configured so that they can pick or scoop up the balls from the raceway in the desired fashion.

Accordingly, the mechanisms used for recirculation of balls within linear motion assemblies along with the cost associated with their manufacture and the overall cost associated with the manufacture and assembly of linear motion assemblies can be improved.

SUMMARY OF THE INVENTION

A linear motion assembly constructed in accordance with one aspect of the invention includes a screw having a helical external groove extending over a plurality of turns with a radially outwardly extending helical land formed between adjacent turns. The assembly further includes a ball nut having a through bore extending between opposite ends, wherein the through bore is configured for receipt of the screw. The ball nut has a helical internal groove extending over a plurality of turns with a radially inwardly extending helical land formed between adjacent turns. The helical land of the ball nut is radially aligned with the external groove of the screw and the helical land of the screw is radially aligned with the internal groove of the ball nut. The assembly further includes at least one helical recirculation insert having a circuitous recirculation groove. The recirculation insert is configured in radial alignment with, one of the radially inwardly extending helical land of the ball nut and the external groove of the screw or, the radially outwardly extending helical land of the screw and the internal groove of the ball nut. Further yet, a plurality of balls are received in the circuitous recirculation groove.

In accordance with another aspect of the invention, the at least one helical recirculation insert is configured in radial alignment with the radially inwardly extending helical land of the ball nut and the external groove of the screw.

In accordance with another aspect of the invention, the circuitous recirculation groove extends along opposite sides of the radially inwardly extending helical land of the ball nut, wherein one side of the circuitous recirculation groove provides a loaded path of balls and an opposite side of the circuitous recirculation groove provides an unloaded path of balls.

In accordance with another aspect of the invention, the circuitous recirculation groove extends within the external groove of the screw between adjacent, axially aligned portions of the radially outwardly extending land. One of the axially aligned portions of the radially outwardly extending land provides a portion of a loaded ball path for the loaded path of balls and the opposite one of the axially aligned portions of the radially outwardly extending land provides a portion of an unloaded ball path for the unloaded, recirculation of the balls.

In accordance with another aspect of the invention, a plurality of helical recirculation inserts are configured in radial alignment with one of, the radially inwardly extending helical land of the ball nut and the external groove of the screw or, the radially outwardly extending helical land of the screw and said internal groove of the ball nut.

In accordance with another aspect of the invention, the ball nut has an axially extending slot interrupting the helical internal groove, wherein the slot is configured to fixedly received end portions of the plurality of the helical recirculation inserts.

As such, a linear motion assembly constructed in accordance with the invention, among other objects, features and advantages which will become readily apparent to those skilled in the art, provides a mechanism for uniformly supporting loads over a maximum number of balls, provides an efficient ball return mechanism, reduces downtime of the assembly, has a relatively compact outer envelope, provides increased load carrying capacity, is economical in manufacture, and has a long and useful life.

BRIEF DESCRIPTION OF THE DRAWINGS

These and some other objects, features and advantages of the invention will become readily apparent to those having ordinary skill in the art of recirculating ball-type linear motion assemblies in view of the following detailed description of the presently preferred embodiments and best mode, appended claims, and accompanying drawings, in which:

DETAILED DESCRIPTION OF PRESENTLY PREFERRED EMBODIMENTS

Figure 1:
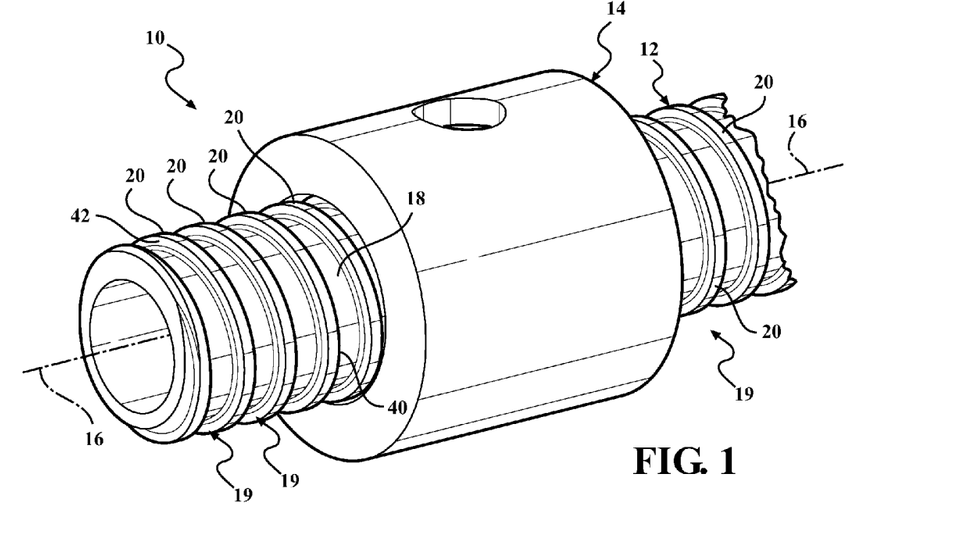
FIG. 1 is a partial perspective view of a linear motion assembly constructed in accordance with one presently preferred aspect of the invention.
Figure 2:
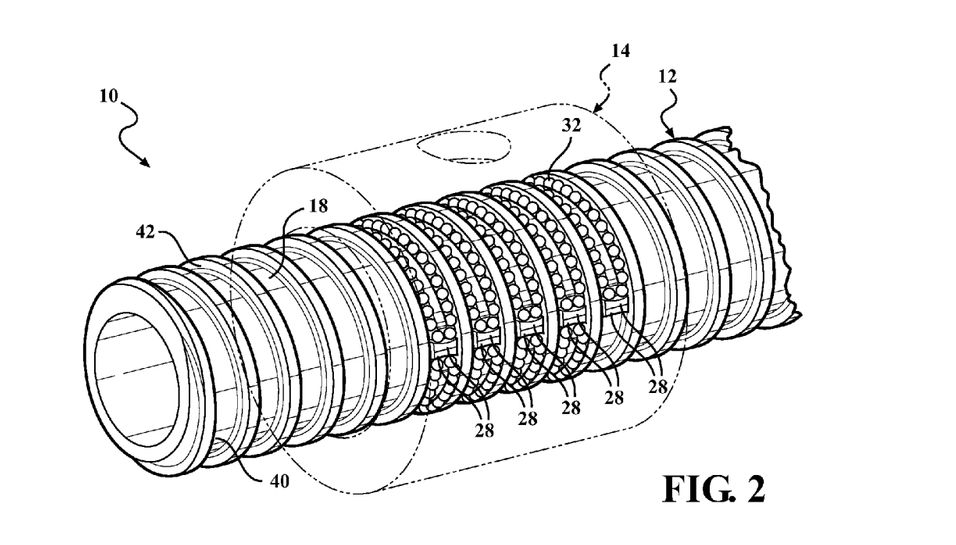
FIG. 2 is a view similar to FIG. 1 with a ball nut of the assembly shown partially transparent.
Figure 3:
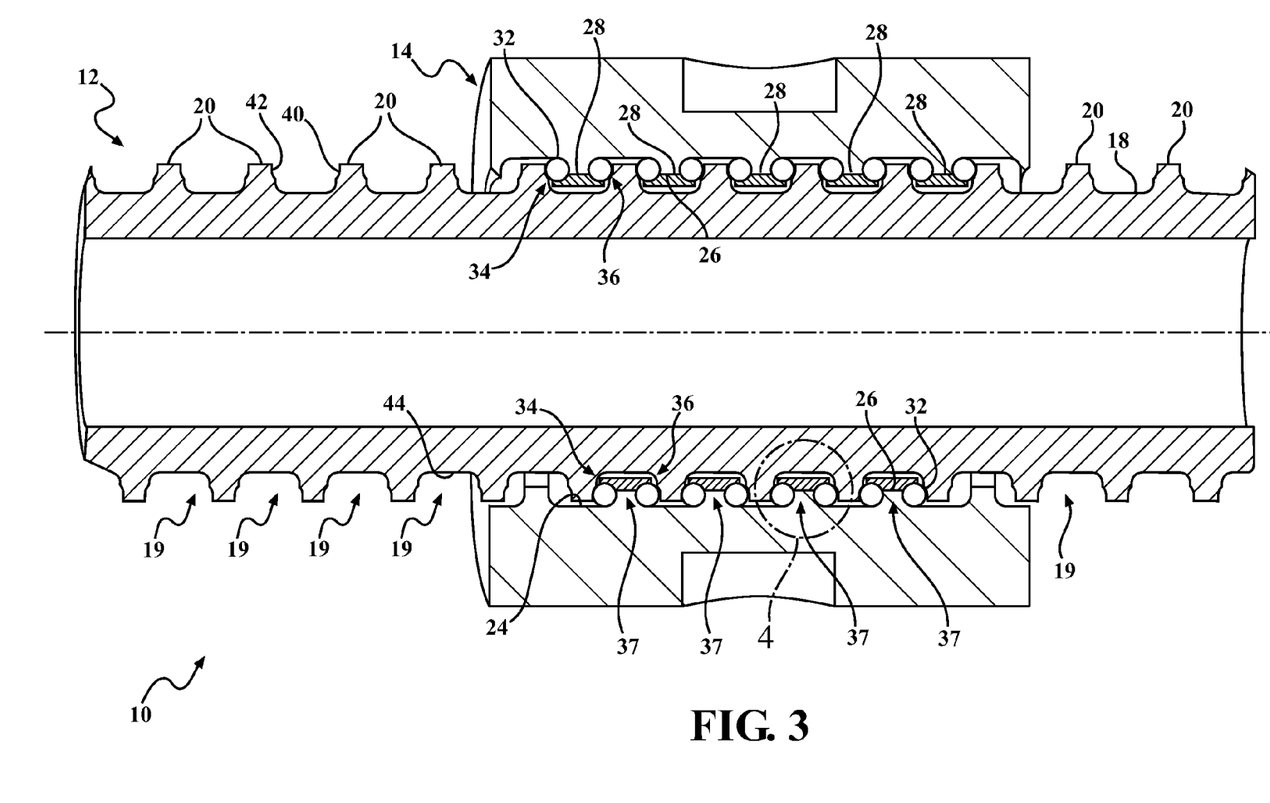
FIG. 3 is a cross-sectional view taken generally along the line 3-3 of FIG. 1.
Figure 4:
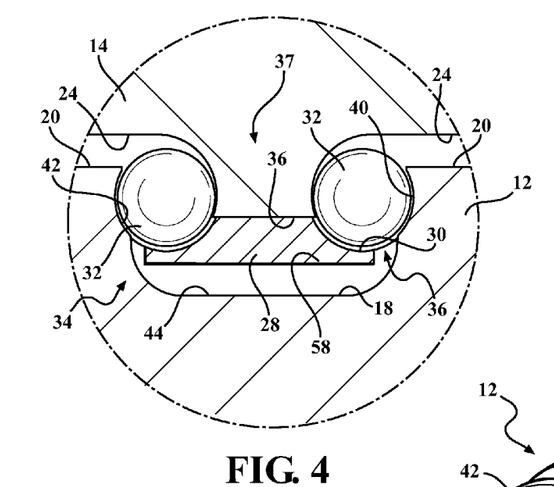
FIG. 4 is an enlarged view of the encircled area 4 of FIG. 3.
Figure 5:
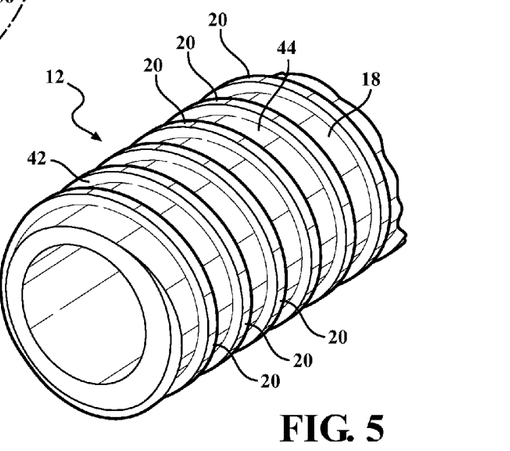
FIG. 5 is a partial perspective view of a screw of the linear motion assembly of FIG. 1.
Figure 6:
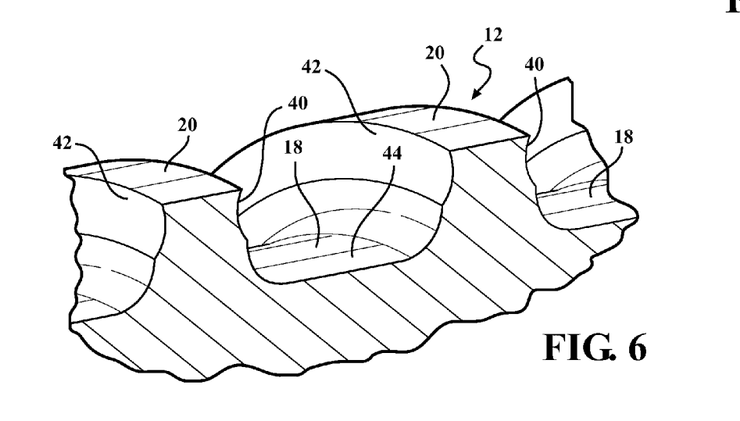
FIG. 6 is a partial enlarged view of the screw of FIG. 5.
Figure 7:
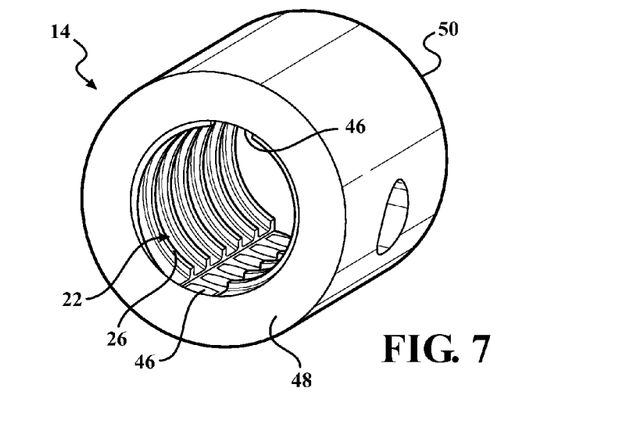
FIG. 7 is a perspective view of a ball nut of the linear motion assembly of FIG. 1.
Figure 8:
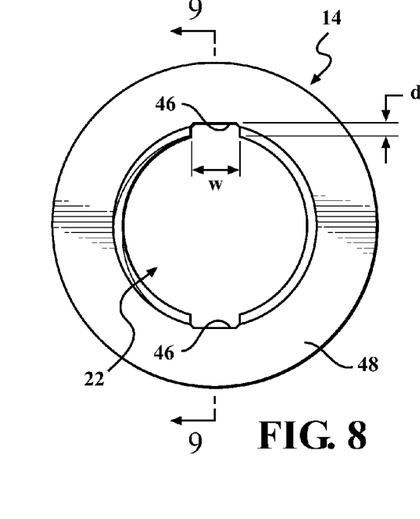
FIG. 8 is an end view of the of the ball nut of FIG. 7.

Referring now in more detail to the drawings, FIG. 1 illustrates a linear motion assembly, shown as a ball screw assembly, by way of example and without limitation, referred to hereafter as assembly 10, constructed in accordance with one aspect of the invention. The assembly 10 includes a shaft or screw, generally designated 12, assembled coaxially with a ball nut, generally designated 14 along an axis 16 about which relative rotation occurs. The screw 12 has a helical external groove 18 extending continuously over a plurality of turns 19 (identified mainly in FIG. 1 for sake of convenience) with a radially outwardly extending, continuous helical land 20 formed between adjacent turns 19. The ball nut 14 has a through bore 22, as best shown in FIGS. 7 and 8, configured for receipt of the screw 12. The ball nut 14 has a helical internal groove 24 extending over a plurality of turns 25 (identified mainly in FIG. 9 for sake of convenience) with a radially inwardly extending helical land 26 formed between adjacent turns 25. The helical land 26 of the ball nut 14 is radially aligned with the external groove 18 of the screw 12 and the helical land 20 of the screw 12 is radially aligned with the internal groove 24 of the ball nut 14 upon assembly and during use. The assembly 10 further includes at least one helical recirculation insert 28 having a circuitous recirculation groove 30, wherein the recirculation insert 28 is configured in radial alignment with and between one of, the radially outwardly extending helical land 20 of the screw 12 and the internal groove 24 of the ball nut 14 or, as shown here, the radially inwardly extending helical land 26 of the ball nut 14 and the external groove 18 of the screw 12. A plurality of balls 32 are received in each of the circuitous recirculation grooves 30 for circulation thereabout in opposite circumferential directions.

Figure 10:
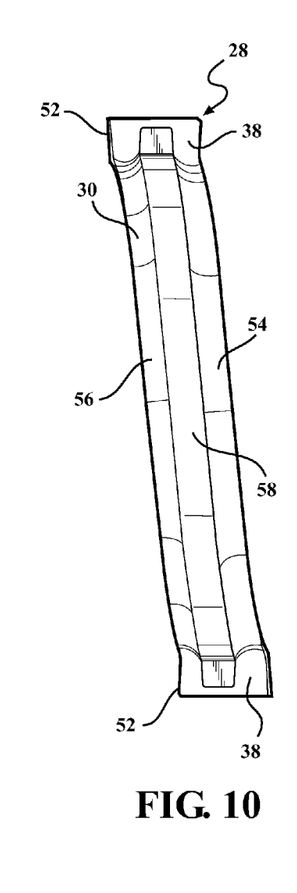
FIG. 10 is an outer side view of a recirculation insert of the linear motion assembly of FIG. 1.
Figure 11:
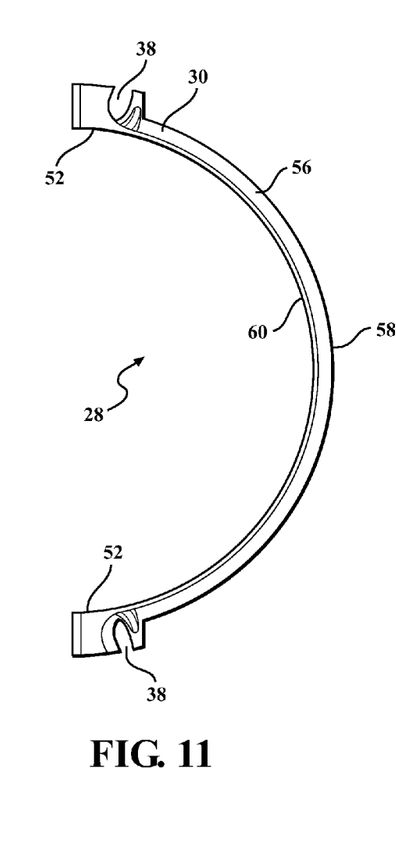
FIG. 11 is an end view of the recirculation insert of FIG. 10.
Figure 12:
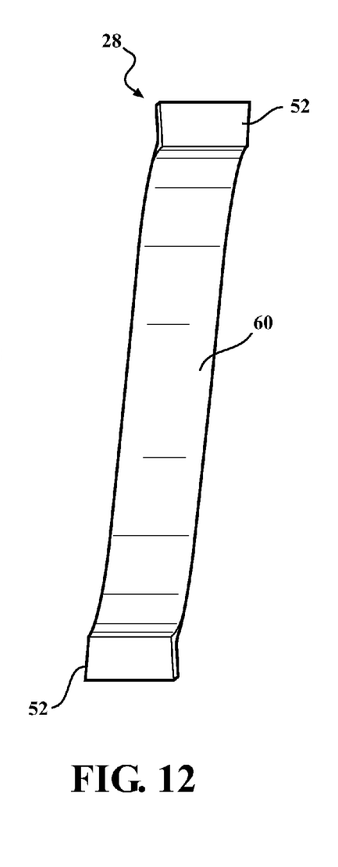
FIG. 12 is an inner side view of the recirculation insert of FIG. 10.

Each recirculation groove 30 provides, in combination with the screw 12 and ball nut 14, a pair of opposite helically extending ball tracks 34, 36 in circuitous connection with one another via generally U-shaped end return loops 38 of the recirculation groove 30, as best shown in FIGS. 10 and 11. As such, each insert 28 facilitates channeling the balls 32 circuitously through separate, discrete continuous ball paths 37. The balls 32 rolling in one of the tracks 34, 36 move circumferentially in one direction while the balls 32 rolling in the opposite track 34, 36 move circumferentially in an opposite direction, with only one of the tracks 34, 36 carrying the balls 32 under a supporting load at any moment, with the other of the tracks 34, 36 carrying the balls 32 in a substantially unloaded state. Accordingly, the balls 32 move continuously in and out of loaded and unloaded tracks 34, 36 as they circulate about the ball path 37. Of course, the track 34, 36 that is loaded and unloaded depends on the relative axial load direction between the screw 12 and ball nut 14.

The screw 12, as indicated above, is provided with the continuous helical groove 18, however, unlike conventional screws that provide a single ball track within a groove, the groove 18 provides a pair of axially spaced ball grooves 40, 42 across opposite sides of the groove 18 on a surface of the upstanding helical land 20. The ball grooves 40, 42 are represented here as having a concave surface extending laterally into a side surface of the upstanding helical land 20. The concave radius of curvature of the ball groove 40, 42 can be configured as needed to provide the desired contact patch between the balls 32 and the ball grooves 40, 42, wherein the grooves 40, 42 can have a slightly increased radius of curvature relative to the balls 32, or they can be formed having a "Gothic arch" configuration, or otherwise. As shown, the ball tracks 40, 42 are formed along a surface adjacent an upper, radially outermost surface of the lands 20, such that the balls 32 roll radially outwardly from a generally flat valley 44 of the groove 18.

The groove 24 in the ball nut 14 follows the same helical pitch or path as the groove 18 in the screw 12. However, unlike convention ball screws, the grooves 18, 24 are not radially aligned opposite one another to provide the ball track, but rather, the groove 24 of the ball nut 14 is axially staggered relative to the groove 18 in the screw 12 in overlying relation with the land 20 of the screw 12. The groove 24 is configured to receive a radially outermost end portion of the screw land 20 therein, wherein the screw land 20 remains axially spaced generally equidistant between axially aligned portions of the land 26 of the ball nut 14. As such, with the ball nut 14 disposed coaxially about the screw 12, the individual helical ball paths 37 are provided between axially aligned portions of the screw land 20 within the external groove 18 of the screw 12 and along opposite sides of the land 26 within adjacent portions of the groove 24 of the ball nut 14. The sides of the land 26 forming the portion of the ball path 37 can be configured as needed to provide the desired contact patch between the balls 32 and the sides of the lands 26, wherein the sides of the land 26 can have a slightly increased radius of curvature relative to the balls 32, or they can be formed having a "Gothic arch" configuration, or otherwise.

Figure 9:
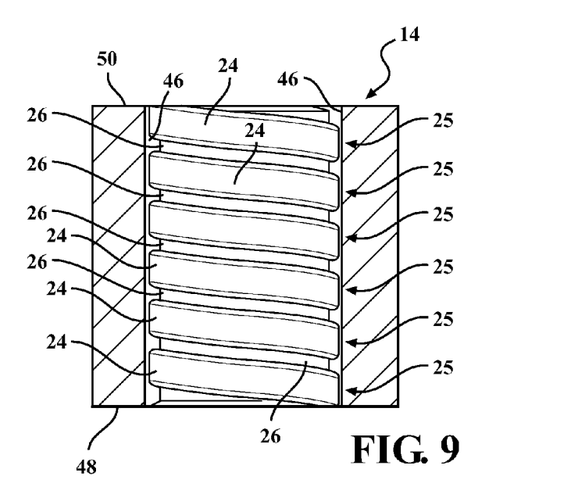
FIG. 9 is a cross-sectional view taken generally along the line 9-9 of FIG. 8.

As shown in FIGS. 7-9, to facilitate fixing the inserts 28 within the ball nut 14, the ball nut 14 has at least one, and shown here as a pair of diametrically opposite recessed slots 46 extending between and interrupting portions of the groove 24, wherein the slots 46 are represented here as extending axially between opposite ends 48, 50 of the ball nut 14. The slots 46 are formed having a predetermined depth (d) and width (w) to receive end portions 52 of the inserts 28 in fixed and flush relation therein.

The ball nut 14 is generally adapted for attachment to a member (not shown) which is required to move linearly along the axis 16 in response to rotation of the screw 12. The mechanisms for attachment of the ball nut 14 to the member are generally known, such as via trunnions or direct attachment via fasteners to one or both of the ends of the ball nut 14, for example. Alternatively, the ball nut 14 could be axially fixed and the screw 12 axially translational.

The inserts 28 are represented here, by way of example and without limitation, as individual components extending helically 180 degrees between the opposite ends 52. The inserts 28 could be configured to extend a lesser or greater number of degrees, as would be apparent to one skilled in the art of ball screws upon review of the disclosure herein. Accordingly, the inserts 28 could take on the appearance of a helical spring configuration. The recirculation groove 30 of the separate inserts 28 has a pair of opposite helically extending ball grooves 54, 56 connected with one another via the end return loops 38. A radially outwardly facing central land 58 extends helically between the opposite grooves 54, 56 and a substantially cylindrical inner surface 60 faces radially inwardly. The central land 58 has a radially outermost surface configured to conform or substantially conform with a radially inner most surface of the ball nut land 26. As such, in accordance with one mechanism for fixing the inserts 28 within the ball nut 14, the inserts 28 are squeezed, compressed, or slightly wound to be slightly reduced in diameter, then inserted into the proper orientation within the through bore 22 of the ball nut 14, and then allowed to relax to retain or substantially retain their unbiased increased diameter configuration whereupon the ends 52 are received in fixed fashion within the slot 46. In the embodiment illustrated, the ends 52 of helically adjacent inserts 28 abut one another in flush or substantially flush relation. It should be recognized that fasteners, e.g. set screws, adhesives, or the like, can be used to facilitate fixing the inserts 28 within the ball nut 14, if desired. Otherwise, a purely snap fit or slight interference can be used.

In operation, depending on the relative direction of load applied between the screw 12 and the ball nut 14, one of the ball tracks 34, 36 has balls 32 rolling under load between the respective ball groove 40, 42 of the screw 12 and the corresponding side of the land 26, while the balls 32 on the opposite ball track 34, 36 are unloaded and free to roll within the confines provided by the ball groove 42, 44, the corresponding side of the land 26 and the respective ball groove 54, 56 of the retainer 28. Upon being channeled through the unloaded ball track 34, 36, the balls 32 are channeled through the U-shaped end return tracks 38 whereupon they enter the loaded ball track 34, 36. Of course, the unloaded and loaded tracks 34, 36 change with the change in relative load direction applied between the screw 12 and the ball nut 14.

Figure 13:
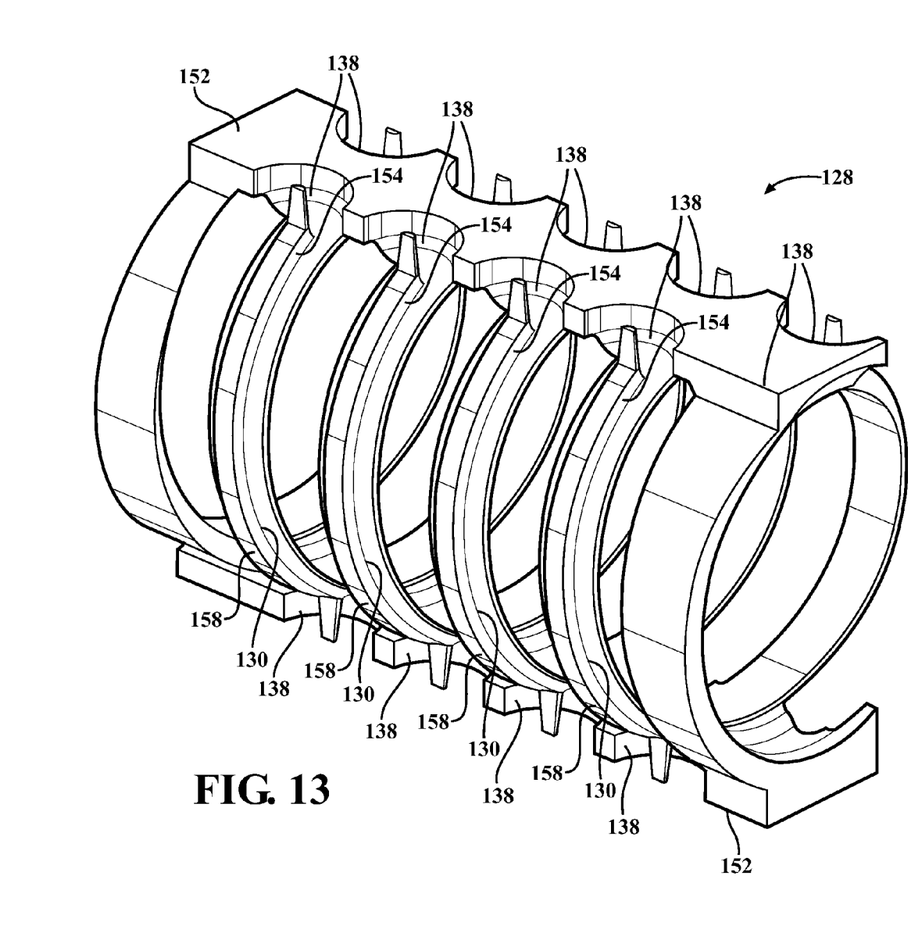
FIG. 13 is a perspective view of a recirculation insert constructed in accordance with another aspect of the invention.
Figure 14:
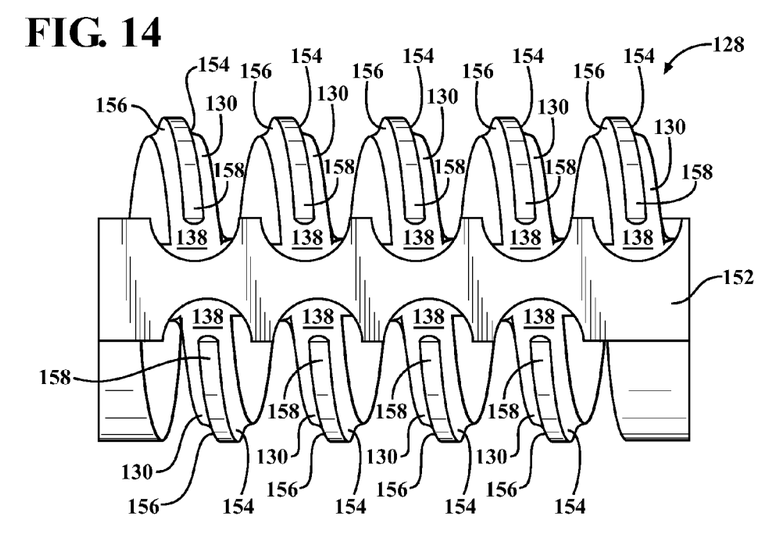
FIG. 14 is an outer side view of the recirculation insert of FIG. 13.
Figure 15:
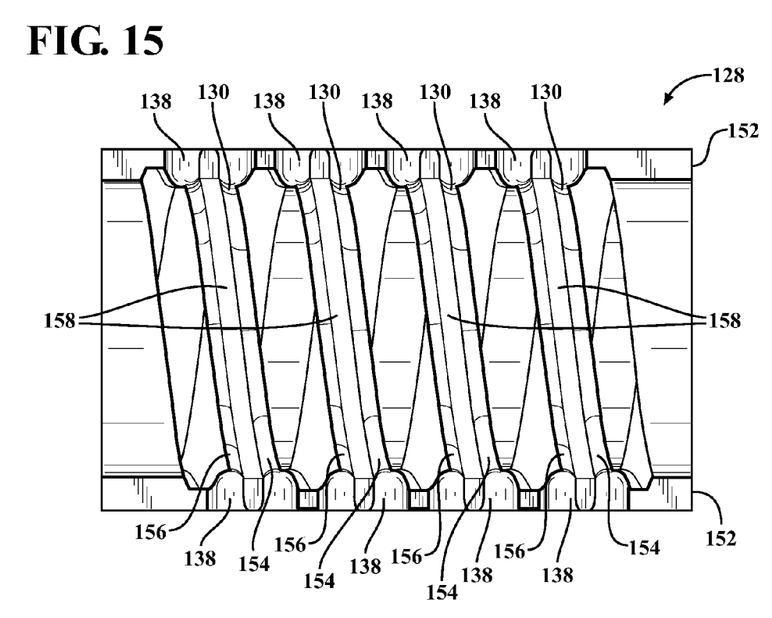
FIG. 15 is an outer top view of the recirculation insert of FIG. 13.

In FIGS. 13-15, a single piece recirculation insert 128 constructed in accordance with another aspect of the invention is shown, wherein the same reference numerals as used above, offset by a factor of 100, are used to identify like features. The single piece recirculation insert 128 functions the same as described above with regard to a plurality of separate inserts 28, however, assembly of the single piece insert 128 into the ball nut 14 is made much easier and quicker. In essence, the single piece insert 128 is a plurality of the separate inserts 28 formed as a single, monolithic piece of material, such as in molding operation, for example. Accordingly, the single piece insert 128 has a plurality of separate recirculation grooves 130 with each groove 130 having opposite helically extending ball grooves 154, 156 connected with one another via the end return loops 138. Thus, the each recirculation groove 130 provides, in combination with the screw 12 and ball nut 14, a pair of opposite helically extending ball tracks in circuitous connection with one another via generally U-shaped end return loops 138 of the recirculation groove 130, as discussed above with regard to FIGS. 10 and 11. As such, the single piece insert 128 facilitates channeling the balls 32 circuitously through separate, discrete continuous ball paths.

As mentioned above, the single piece insert 128 represents a plurality of the individual inserts 28 molded as a single piece, wherein the ends 52 of the individual inserts 28 are molded as diametrically opposite single piece ends, also referred to as rails 152, extending along the full length of the insert 128. Thus, the single piece insert 128 includes an outwardly facing central land 158 extending helically between each pair of opposite grooves 154, 156 that is configured to conform or substantially conform with a radially inner most surface of the ball nut land 26. In the embodiment illustrated, the rails 152 are configured for close, fixed receipt within the slots 46 of the ball nut 14. Otherwise, aside from being constructed as a single piece of material, the insert 128 functions the same as discussed above with regard to the individual inserts 28, and thus, no further discussion is believed necessary.

It should be recognized that upon reading the disclosure herein, one ordinarily skilled in the art of ball screw assemblies would readily recognize other embodiments than those expressly discussed herein, with those embodiments being within the spirit and scope of the invention. The scope of the invention is defined by the following claims, and any claims which issue as a result of an application related hereto.

What is claimed is:

1. A linear motion assembly, comprising:
a screw having a helical external groove extending over a plurality of turns with a radially outwardly extending helical land formed between adjacent turns;
a ball nut having a through bore extending between opposite ends of said ball nut, said through bore being configured for receipt of said screw and having a helical internal groove extending over a plurality of turns with a radially inwardly extending helical land formed between adjacent turns, said helical land of said ball nut being radially aligned with said external groove of said screw and said helical land of said screw being radially aligned with said internal groove of said ball nut;
at least one recirculation insert having a circuitous recirculation groove, said recirculation insert being configured in radial alignment with one of said radially inwardly extending helical land of said ball nut and said external groove of said screw or said radially outwardly extending helical land of said screw and said internal groove of said ball nut; and
a plurality of balls received in said circuitous recirculation groove and contacting said helical external groove of said screw, said helical internal groove of said ball nut, and said circuitous recirculation groove of said at least one recirculation insert.

2. The linear motion assembly of claim 1 wherein said at least one recirculation insert is in radial alignment with said radially inwardly extending helical land of said ball nut and said external groove of said screw.

3. The linear motion assembly of claim 2 wherein said circuitous recirculation groove extends along opposite sides of said radially inwardly extending helical land of said ball nut.

4. The linear motion assembly of claim 2 wherein said circuitous recirculation groove extends within said external groove of said screw between adjacent, axially aligned portions of said radially outwardly extending land.

5. The linear motion assembly of claim 4 wherein said at least one recirculation insert is received in a clearance fit within said external groove of said screw.

6. The linear motion assembly of claim 4 wherein a pair of concave ball grooves are formed along opposite sides of said radially outwardly extending land, said balls making rolling contact with said concave ball grooves.

7. The linear motion assembly of claim 1 wherein a plurality of said recirculation inserts are configured in radial alignment with one of said radially inwardly extending helical land of said ball nut and said external groove of said screw or said radially outwardly extending helical land of said screw and said internal groove of said ball nut.

8. The linear motion assembly of claim 7 wherein each one of said recirculation inserts provides a separate circuitous recirculation groove.

9. The linear motion assembly of claim 1 wherein said at least one recirculation insert has a plurality of separate circuitous recirculation grooves.

10. The linear motion assembly of claim 9 wherein said at least one recirculation insert is a single piece of material extending substantially between said opposite ends of said ball nut.

11. The linear motion assembly of claim 10 wherein said ball nut has at least one axially extending slot extending between said opposite ends, said at least one slot interrupting said helical internal groove.

12. The linear motion assembly of claim 11 wherein said recirculation insert has elongate rails corresponding in number to said at least one slot, each one of said rails being configured for close receipt in a separate slot.

13. The linear motion assembly of claim 1 wherein said ball nut has at least one axially extending slot extending between said opposite ends, said at least one slot interrupting said helical internal groove.

14. The linear motion assembly of claim 13 wherein said at least one recirculation insert is configured for fixed receipt in said at least one slot.

15. The linear motion assembly of claim 1 wherein said at least one recirculation insert is between said radially inwardly extending helical land of said ball nut and said external groove of said screw.

\* \* \* \* \*